United States Patent [19]

Gale et al.

[11] Patent Number: 4,608,089

[45] Date of Patent: Aug. 26, 1986

[54] CEMENT MATRIX COMPOSITES AND METHOD OF MAKING SAME

[75] Inventors: David M. Gale; Hyunkook Shin, both of Wilmington, Del.

[73] Assignee: E. I. Du Pont de Nemours and Company, Wilmington, Del.

[21] Appl. No.: 756,705

[22] Filed: Jul. 19, 1985

[51] Int. Cl.⁴ .............................. B28B 1/26; B28B 1/52
[52] U.S. Cl. ........................................ 106/90; 106/99; 264/86; 264/333; 264/DIG. 47
[58] Field of Search .............. 264/DIG. 47, 5, 331.17, 264/333, 86; 428/521, 902, 910; 106/90, 99

[56] References Cited

U.S. PATENT DOCUMENTS 2,183,965 12/1939 Ledeboer .............................. 264/86
3,169,899 2/1965 Steuber .
4,344,804 8/1982 Bijen et al. .......................... 264/333

FOREIGN PATENT DOCUMENTS 866129 8/1978 Belgium .
891945 3/1962 United Kingdom .

OTHER PUBLICATIONS

Kirk–Othmer Encyclopedia of Chemical Technology, vol. 19, Third Edition, p. 433, "Pulp, Synthetic".

*Primary Examiner*—Donald Czaja
*Assistant Examiner*—Leo Tentoni

[57] ABSTRACT

Cement matrix composites of improved flexural toughness are prepared with polyethylene fibrids of high orientation from plexifilamentary structures as reinforcement.

7 Claims, No Drawings

CEMENT MATRIX COMPOSITES AND METHOD OF MAKING SAME

BACKGROUND OF THE INVENTION

Asbestos has long been used in cement structures. Problems encountered by use of asbestos have prompted efforts to find replacements. Staple synthetic fibers have been used as reinforcement with pulps as filter aids. Cellulose pulps have been used for this purpose and for reinforcement but cement matrix composites reinforced solely by cellulose have durability problems. Polyolefin pulps which have also been used are relatively inexpensive, however, it is generally known that polyolefin pulps do not function as reinforcing fibers (see Kirk-Othmer: Encyclopedia of Chemical Technology, Volume 19, Third Edition p. 433). Preparation of a cement composite of good flexural toughness by use of a polyethylene pulp is a worthwhile objective.

SUMMARY OF THE INVENTION

The present invention is directed to the preparation of a cement matrix composite reinforced, at least in part, with polyethylene pulp which comprises, making an aqueous slurry of Portland cement and a pulp of oriented polyethylene fibrids having a birefringence of at least about 0.030 and prepared from a plexifilamentary structure, depositing the slurry on a porous surface, dewatering the slurry and curing the composite. The polyethylene pulp constitutes from 0.1 to 10% by wt. of the composite. If desired, reinforcing fibers may be incorporated in addition to the fibrids. Also contemplated herein is the composite obtained by this process.

DETAILED DESCRIPTION OF THE INVENTION

The pulp of oriented polyethylene fibrids employed in the process of the present invention may be prepared as shown in British Pat. No. 891945 of Mar. 21, 1962, and such disclosure is incorporated herein by reference. It describes the preparation of plexifilaments by flash spinning, cutting of the plexifilaments into lengths convenient for handling in the processing equipment, dispensing of the cut plexifilaments in a liquid medium and subsequently beating the cut filaments in the liquid medium to a fibrid pulp. A large variety of suitable beating equipment is mentioned in this reference as well as conditions under which the beaten dispersion is prepared. For of the present invention, the plexifilaments are made of polyethylene and the pulp has a birefringence of at least about 0.030 preferably at least 0.032, when measured as hereinafter described.

In the examples of the invention which are given later in this specification, the pulp was conveniently prepared from a non-woven polyethylene sheet obtained by the general method described in U.S. Pat. No. 3,169,899.

According to a preferred method for making sheets of this type, linear polyethylene having a density of 0.95 g/cm$^3$, a melt index of 0.9, as determined by ASTM method D-1238-57T, Condition E, and melting below about 135° C., is flash-spun from a 12% solution of the polymer in trichlorofluoromethane. The solution is continuously pumped to spinneret assemblies at a temperature of 179° C. and a pressure above about 85 atmospheres. The solution is passed in each spinneret assembly through a first orifice to a pressure let-down zone and through a second orifice into the surrounding atmosphere. The resulting strand or plexifilament may be characterized as a three-dimensional plexus of interconnecting random length fibrous elements referred to as film-fibrils. These have the form of thin ribbons of less than 4 microns in thickness. The strand is spread and oscillated by means of a shaped rotating baffle, is electrostatically charged, and then is deposited on a moving belt. The spinneret assemblies are spaced to provide overlapping intersecting deposits on the belt to form a batt. The batt is then lightly consolidated by passage through the nip of rollers that apply to the batt a compression of about 1.8 kg/cm of batt width to form a lightly consolidated sheet. Generally, such sheets having a basis weight in the range of 25 to 75 g/m$^2$ and a density in the range of 0.15 to 0.3 g/cm$^3$ are useful. The lightly consolidated sheet is slit longitudinally into strips from 1 to 5 inches in width. The strips are then chopped into lengths of from 4 to 12 inches by passage through a rotating blade.

A pulp is produced by feeding the chopped material to a Sprout-Waldron 36-2 disc refiner along with water and additives to assist in the refining process and to improve the dispersibility of the pulped product. For the examples below, the additives included 2% polyvinyl alcohol (Air Products Vinol (205-S) and 0.1% of a surfactant (Triton X-100, Rohm & Haas), based on the weight of the polyethylene and the materials were passed through the refiner three times with the stock being diluted with water each time to a final dilution of 1.0%.

The material was diluted further with water to a concentration of 0.56% and passed through a bank of Bauer centrifugal cleaners. The material was then dewatered in a standard sheet machine (screen mesh of 150). The orientation of dried pulp was determined by birefringence measurement in accordance with the technique described below. It exhibited a birefringence of 0.032.

The production of cement composites is well known to those skilled in the art. Belgian Pat. No. 866,129 shows a variety of such techniques. Basically, the fibrids are dispersed in water with Portland cement and mixed. If desired, short staple length fibers may be added. The suspension may be deposited on a sieve and the water drained. The layer of cement and fibrids is then cut to size and cured as is well-known in the art.

For the present invention, from 0.1 to 10% of fibrids should be present based on the wt. of the composite, preferably from 2 to 8%. Surprisingly, this is found to substantially increase the toughness of the composite. Optionally cellulose pulp may be added to assist filtration. Generally from about 1 to 10% by wt. is employed. The addition of short staple fiber may greatly increase flexural toughness of the composite. From about 0.1 to 10% of such staple fiber based on the wt. of the composite is used preferably from 0.5 to 4%. The staple may be selected from the group of synthetic or natural fibers normally used for cement reinforcement, such as polyacrylonitrile fiber, polyvinyl alcohol fiber, or p-aramid fiber. The staple lengths are generally from about 1 to 20 mm.

TEST PROCEDURES

Birefringence

Birefringence is determined by measuring the refractive index parallel $n_\parallel$ and perpendicular $n_\perp$ to the fiber axis by interference microscopy. The difference between the two refractive indices is the birefringence. The microscope is a Leitz transmitted light interference microscope employing a Mach-Zehnder type interferometer. Illumination is provided by a mercury arc lamp filtered to give a wavelength of 546 nm.

Refractive index measurements are carried out as follows: A plain microscope slide is halved and some fibers are placed on both halves. A frew drops of refractive index liquid (Cargille Certified Refractive Index Liquids, R. P. Cargille Laboratories, Inc.) and a cover slip are deposited on both slides. One slide preparation is placed on the sample stage of the microscope and positioned so there are fibers in the field of view. The other preparation is placed on the microscope's reference stage with no fibers in the field of view. This is a standard procedure to ensure that both beams of the interferometer have identical path lengths. The interferometer is adjusted so that vertical fringes appear in the field of view with the fibers oriented perpendicularly to the fringes. To measure $n_{\parallel}$ the microscope's analyzer is set to transmit light vibrating parallel to the fiber axis. The interferometer is adjusted for maximum sharpness of the fringes. If the fringes are displaced when passing through the fiber, another preparation is required using a different refractive index liquid. When a fluid is found that does not cause a fringe displacement in the fiber, the refractive index of the fluid and fiber are identical. The nominal value of the fluid is corrected for wavelength dispersion and temperature by referral to an optical data print-out supplied by Cargille for each of their refractive index liquids. The procedure is then repeated for $n_{\perp}$ after adjusting the analyzer to transmit light perpendicular to the fiber axis.

Flexural Testing of Cement Composites

Fiber reinforced cement composites were evaluated by determining flexural toughness (also called work-to-break). The test is described in ASTM D-790. Flexural testing is used frequently by the asbestos cement industry as a measure of product performance for sheet products such as roofing tiles, building panels, etc. Cement samples (2.54 cm×15.2 cm×0.5 cm), prepared as described below, were tested according to the above ASTM method in 3-point bending in an Instron test machine. A span of 7.6 cm was used in all cases. Test specimens are loaded to failure, and the maximum stress level determined graphically with a chart recorder. Flexural toughness is taken as the integrated area under the stress-strain curve until maximum stress is reached, measured in kJ/sq m (kilojoules per square meter). All samples, including controls were tested in the same way.

EXAMPLES

Procedure for Preparation of Cement Composites

For evaluation purposes, fiber reinforced cement composites are prepared which contain 200 gm of Portland cement and 12 gm of fibrous synthetic materials. Pulps are prepared by placing 4–12 gm (dry basis) of unopened pulp into a home blender with 1 l of water and blending on low speed for about 30 seconds (pulp all fluffed up). Opened pulps, thus prepared, are added to a plastic bucket containing about 4 l of water. If a reinforcing staple fiber is employed, 4 gm is then added to the bucket. The mix is dispersed for 5 min with gentle agitation using a vibrating laboratory stirrer. Type 1 Portland cement, 200 gm dispersed into a slurry with 1 l of water, is then added. Flocculation is induced by addition of 4 ml of a 0.1% solution of flocculating agent (Separan AP-273 manufactured by Dow Chemical Co.). The entire slurry is then cast into a sheet 33 cm×33 cm and approximately 1.5-2 mm thick by pouring into a standard Deckle box paper making mold and dewatering. The resulting sheet is then folded into four layers, trimmed to 15.2×15.2 cm and pressed in a mold for 30 min at 1667 psi. The resulting cement sample is then removed from the mold and cured for 28 days immersed in saturated lime water. The cement tile is cut into strips 2.54 cm wide with a diamond saw. The strips are re-immersed in lime water and tested wet in 3-point bending to determine flexural toughness.

Example 1

Cement composites were prepared using 12 gm of opened plexifilamentary pulp prepared following the general procedures described above and 200 gm of cement according to the above procedure, and flexural toughness measured and compared to controls prepared and measured identically but using opened Hercules, Inc. "Pulpex ED" polyethylene pulp. The control cement composite derived from Pulpex ED had a flexural toughness of 0.07 kJ/sq m as compared to the cement composite of the invention which exhibited a flexural toughness of 1.67 kJ/sq m. The birefringence of Pulpex ED was measured and found to be 0.020 while that of the plexifilamentary pulp was 0.032.

Example 2

Cement composites were prepared using 8 gm of opened plexifilamentary pulp as in Example 1, 4 gm of polyvinyl alcohol fiber (Kuraray Corp. "Kuralon 5501") cut into 6 mm staple, and 200 gm of cement using the above procedure. Samples were tested as above and gave flexural toughness of 3.69 kJ/sq m.

Example 3

Cement composites were prepared using 4 gm of opened plexifilamentary pulp as in Example 1, 8 gm of cellulose (opened newspulp) and 200 gm of cement using the procedure of Example 1. Samples tested as above gave flexural toughness values of 0.22 kJ/sq m.

We claim:

1. A method for preparing a cement matrix composite reinforced at least in part with polyethylene pulp which comprises, making an aqueous slurry of Portland cement and a pulp of oriented polyethylene fibrids having a birefringence of at least about 0.030 and prepared from a plexifilamentary structure, depositing the slurry on a porous surface, dewatering the slurry and curing the composite.

2. The process of claim 1 wherein the fibrids constitute from 0.1 to 10% by wt. of the composite.

3. The process of claim 1 wherein the fibrids constitute form 2 to 8% by wt. of the composite.

4. The process of claim 1 wherein from about 0.1 to 10% by wt. of staple fiber is added.

5. The process of claim 1 wherein from about 1 to 10% by wt. of cellulose pulp is added.

6. A cement matrix composite reinforced at least in part with a pulp of oriented polyethylene having a birefringence of at least about 0.030, said pulp constituting from 0.1 to 10% by weight of the composite.

7. The composite of claim 6 wherein the pulp is prepared from a plexifilamentary structure.

* * * * *